United States Patent [19]

Fagan

[11] 4,110,651
[45] Aug. 29, 1978

[54] BRUSH BLOCK ASSEMBLY

[75] Inventor: Louis E. Fagan, Broomall, Pa.

[73] Assignee: Litton Systems, Inc., Beverly Hills, Calif.

[21] Appl. No.: 778,573

[22] Filed: Mar. 17, 1977

[51] Int. Cl.² ............................................ H02K 13/00
[52] U.S. Cl. .............................. 310/239; 310/40 MM; 310/71
[58] Field of Search ............... 310/239, 240, 242, 245, 310/246, 241, 247, 249, 40 MM, 233, 71

[56] References Cited
U.S. PATENT DOCUMENTS

| | | | |
|---|---|---|---|
| 2,683,825 | 7/1953 | Staak | 310/239 |
| 2,842,692 | 7/1958 | Johnson | 310/239 |
| 3,478,240 | 11/1969 | Harris | 310/247 |
| 3,505,549 | 4/1970 | Wacek | 310/247 |
| 3,510,708 | 5/1970 | O'Connor | 310/242 |
| 3,579,007 | 5/1971 | Walter | 310/242 |
| 3,745,393 | 7/1973 | Spors | 310/247 |

Primary Examiner—R. Skudy
Attorney, Agent, or Firm—Brian L. Ribando; M. Michael Carpenter

[57] ABSTRACT

An improved brush block assembly is shown for use within an electric motor wherein each terminal associated with the brush block functions as a terminal and, in addition, as a locating device for the brush block, a current path between the brush and terminal, and a latch for securing the brush block in the motor. The brush block assembly includes a cartridge subassembly having a latch receiving notch and a latching terminal subassembly for engaging the notch. The latching terminal subassembly incorporates the motor terminal in an insulated bushing. The arrangement allows the motor to be mechanically tested before the cartridge subassembly is snapped into the motor for final electrical checkout.

4 Claims, 5 Drawing Figures

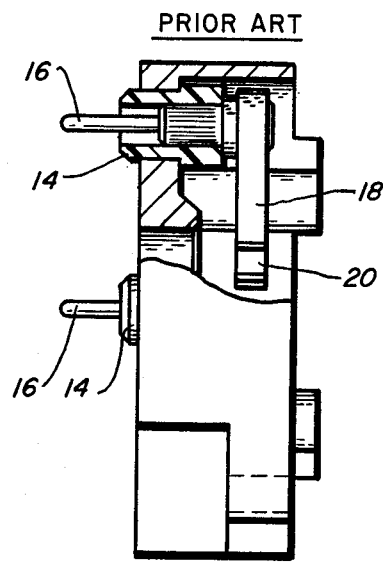
Fig._2 PRIOR ART
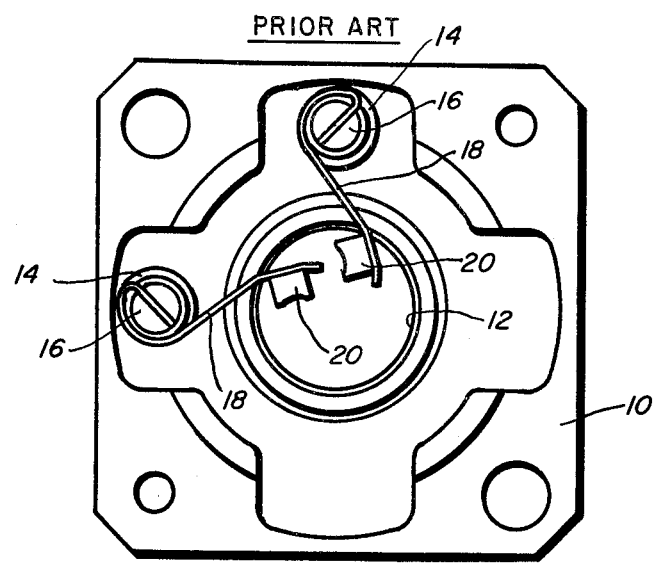
Fig._1 PRIOR ART
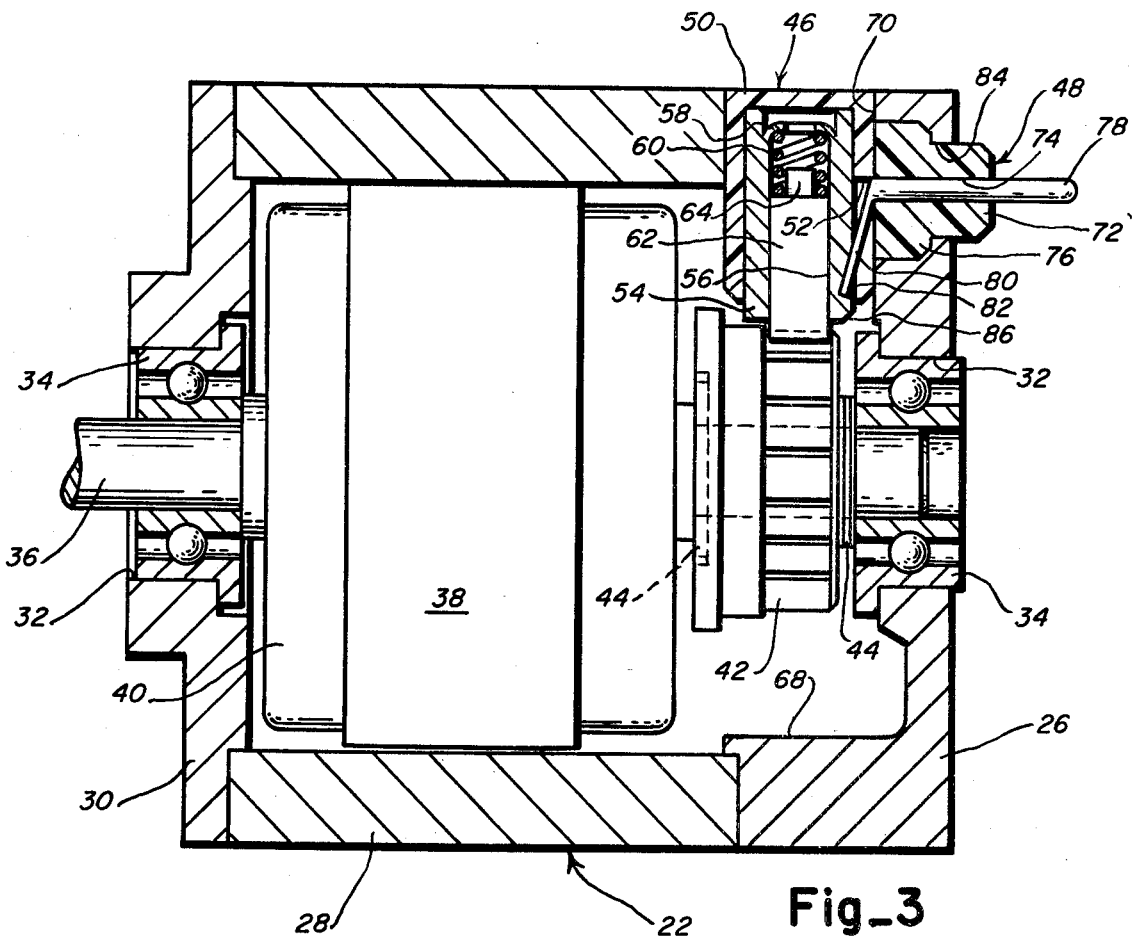
Fig._3

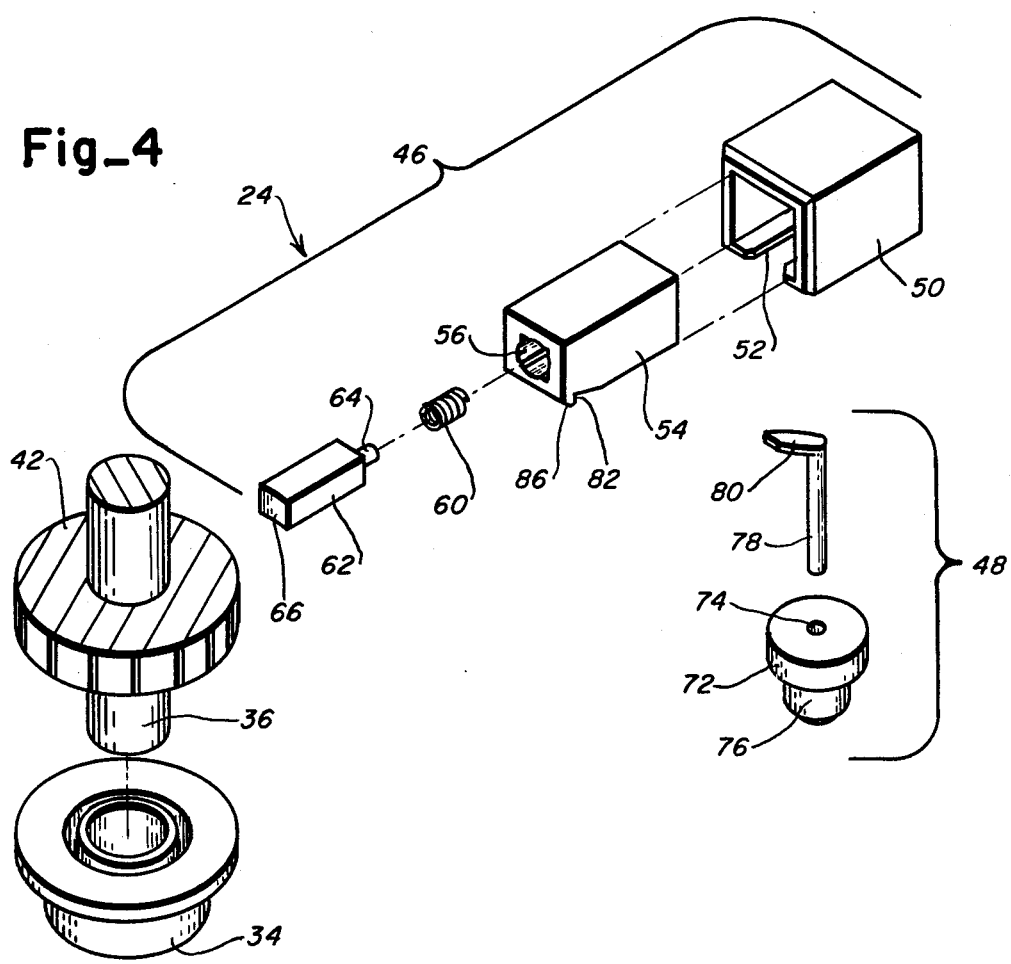
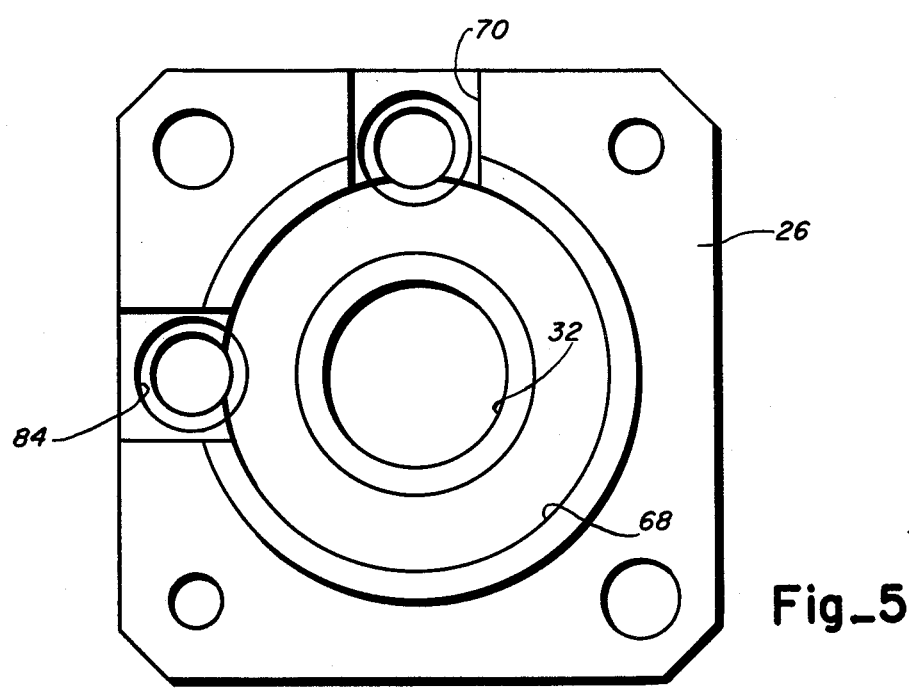

BRUSH BLOCK ASSEMBLY

BACKGROUND OF THE INVENTION

The present invention relates to an improved brush block and, more particularly, to a brush block assembly having a latching terminal subassembly and a cartridge subassembly which may be snapped into the end cap of an electric motor.

The electric motor in which the present invention is utilized may include a low-cost alternating current (AC) universal motor or a synchro in which the slip rings are replaced by brushes. However, the motor most often associated with the present invention is a direct current (DC) motor known as a cube motor. The cube motor is typically one inch high, one inch deep and one inch thick. It is used in applications where a small prime mover is required, such as a typewriter or a portable tape recorder. To meet the limitations of space within a prior art motor, the brushes associated with the commutator have been constructed from spring material, such as beryllium copper, to which the commutator engaging brush block material was soldered. The spring material was then soldered to a terminal which passed through the housing of the motor where electrical connection was completed.

This prior art configuration required the assembly of the motor and brush block assembly before such mechanical features as end play, total indicator run out of the shaft and rotational friction could be checked. If the mechanical features were not within acceptable tolerances, the motor would have to be disassembled and corrected. This increased requirement of time during assembly and checkout, added to the motor cost.

The utilization of a threaded cartridge which houses a spring and brush block is also well known in the art. See, for example, U.S. Pat. No. 3,418,505. However, in small motors, such as a cube motor, the threaded cartridge is not an acceptable design. Other known mechanical means for connecting a brush block assembly securely into the end cap of a motor are also unacceptable in a small motor, due to size restrictions.

SUMMARY OF THE INVENTION

The present invention seeks to eliminate the difficulty encountered during manufacture, assembly and checkout by providing a brush block assembly with a cartridge subassembly that may be snapped into the side of a motor end cap after the motor has been assembled and mechanically checked. The cartridge subassembly is retained within the motor by a latching terminal subassembly which functions as a motor terminal while providing a latch for retaining the cartridge in the appropriate location. The latching terminal further provides an electrical path to the brush.

The improved brush block assembly of the present invention meets the objects of decreased assembly time and cost, while retaining a miniature size. Another object obtained by this invention is an increased life for the brush block assembly.

Further, the improved brush block assembly reduces the need for adjustment and provides equal friction against the commutator as the motor shaft rotates in either direction. Due to the latching configuration of the latching subassembly which allows the cartridge subassembly to be inserted last, it is possible to fully assemble the motor and check out its mechanical features prior to inserting the cartridge subassembly. After the motor has passed its mechanical checkout, the cartridge subassembly is inserted to complete the assembly of the brush block with no soldering.

It has been estimated that the improved brush block assembly of the present invention reduces the cost of a typical cube motor by as much as 12½% over the prior art arrangement shown.

BRIEF DESCRIPTION OF THE DRAWINGS

The objects and advantages described hereinabove for the brush block assembly of the present invention will make further objects and advantages apparent to those skilled in the art after a careful consideration of the following specification when considered with the accompanying drawings, wherein:

FIG. 1 is a plane view of a motor end cap showing a brush block assembly of the prior art;

FIG. 2 is a side view of the end cap of FIG. 1 shown partially in cross section to expose the terminal of the prior art brush block assembly;

FIG. 3 is a side view of an electric motor in cross section showing the brush block assembly of the present invention;

FIG. 4 is an exploded view of the brush block assembly; and

FIG. 5 is a plane view of a motor end cap incorporating the present invention.

DESCRIPTION OF THE PREFERRED EMBODIMENT

Referring now to the drawings, FIG. 1 shows the end cap 10 of a prior art electric motor as viewed from the inside of the motor. The end cap includes a central bore 12 which receives a ball bearing (not shown). As seen in FIG. 2, the prior art end cap 10 includes two insulated bushings 14, typically constructed of nylon, which are press fitted into the cap. Mounted in the axial bore of each bushing 14 is a terminal 16 which is secured therein by a press fit. The inner end of the terminal 16 is slotted to receive a spring arm 18 whose opposite end mounts a brush block 20. The jointure between the brush block 20 and arm 18 and between the arm 18 and terminal 16 may be accomplished by solder.

After review of FIGS. 1 and 2, it will be understood that it is necessary to assemble the end cap 10 on a motor 22, such as shown in FIG. 3, before the mechanical features of that motor can be checked. It will also be realized that the configuration of the prior art spring arms 18 tends to produce greater friction in a clockwise rotational direction, as viewed in FIG. 1, than in a counterclockwise direction. Due to the spring arms 18, the adjustment of pressure between the brush blocks 20 and the commutator of a typical electric motor 22 is an adjustment that can and does become critical.

Turning now to FIG. 3, a typical electric motor is shown incorporating an improved brush block assembly 24. The brush block assembly 24 mounts within an end cap 26 which is secured, as by screws, to one end of a housing 28 having a second end cap 30 secured to its opposite end. Each end cap 26 and 30 is provided with a central bore 32 in which is mounted a flanged ball bearing 34. Mounted within the bearings 34 is a shaft 36 which mounts a rotor comprising laminated pole pieces 38 and windings 40. Also mounted on the shaft 36 is a commutator 42 that is wired to the windings 40 in a manner well known in the art. Spacers 44 are provided to eliminate tolerance differences between the various components of the motor 22.

Referring now to FIGS. 3 and 4, the brush block assembly 24 is shown including a cartridge subassembly 46 and a latching terminal subassembly 48.

The cartridge subassembly 46 includes an insulated housing 50 having a generally square box-like configuration, with the inner, left-hand end of the box opened and the outer, right-hand end closed. A lower side wall of the box 50 is relieved by a slot 52 which provides a clearance for the latching terminal subassembly 48. The insulated housing may be formed from any suitable insulation material, such as nylon. Inserted into the opening of the box housing 50 is a conductive cartridge 54 formed from a suitable conductive material, such as a square brass rod having a cylindrical passage along its axis. The cylindrical passage of cartridge 54 is broached to form a square internal passageway 56. The end of the broached passageway 56 may be closed by a circular punch which peels four tabs 58 from the four walls of the square passageway 56 and bends them toward the center of the opening.

Tabs 58, which close the outer end of the square passageway 56, support a spring 60 in the passageway that is compressed by the presence of a brush 62 against the commutator 42. It will be noted that the brush 62 is provided with a cylindrical stud 64 which centers the spring 60 on the back of the brush and a semicircular surface 66 on the opposite end thereof which makes contact against the commutator. The square configuration of the brush 62 prevents its rotation within the square passageway 56 of the cartridge 54. In a similar manner, the square configuration of the conductive cartridge 54 fits within the square opening of the insulated box-shaped housing 50 which prevents its rotational movement.

As best seen in FIGS. 3 and 5, the end cap 26 is further relieved beyond the bore 32 to form a generally U-shaped configuration wherein the legs of the U-shape form end cap side walls 68. A square slot 70 is cut through the side walls 68 to form a square passageway through which the insulated housing 50 may pass.

To complete the brush block assembly 24, the latching terminal subassembly 48 is mounted in the bottom of the square slot 70. The latching subassembly 48 includes an insulated bushing 72 which is formed with a central bore 74 and a shouldered collar 76. Mounted within the bore 74 is a terminal 78 which, for example, may be formed from a 1/32-inch diameter beryllium copper rod whose end has been flattened and bent at an angle of 60°. The flattened and bent end of terminal 78 thus forms a latch portion 80 which, when the latch subassembly 48 is mounted in slot 70, extends into the square slot 70 for latching the cartridge subassembly 46.

As the cartridge subassembly 46 is inserted into slot 70, the flat latching portion 80 engages a notch 82 in the bottom of the conductive cartridge 54 to prevent is removal. It will be seen in FIG. 4 that the flat latching portion 80 passes through the slot 52 of the insulated housing 50. The latching terminal subassembly 48, which includes the terminal 78 and bushing 72, mounts in a counterbored aperture 84 within the slot 70 with the rounded portion of terminal 78 which extends above the bushing 72 engaging the back of slot 52 to prevent the insertion of insulated housing 50 beyond that point.

The removal of the cartridge subassembly 46 may be accomplished by disassembling the motor 22 to remove the end cap 26. Alternately, a small aperture may be placed in the insulated housing 50 opening into the back of the slot 52 to allow a flat unlatching tool to be inserted into the slot 52 for unlatching engagement with the top of the flat latch portion 80. Note that insulated housing 50 is retained in motor passageway 70 by frictional engagement with the passageway and the upper surface of bushing 72.

It will be understood from the foregoing description that the cartridge subassembly 46 may be preassembled as may the latch terminal subassembly 48. The latch terminal subassembly 48 is then pressed into the end cap 26 which is mounted on the housing 28 for securing the shaft 36 in bearings 34. Due to this arrangement, it is possible to assemble the motor 22 and check for end play, total indicator run out of the shaft and rotational friction before the cartridge subassembly is inserted. Once it is determined that the mechanical features of the motor are acceptable, it is a simple matter to insert the cartridge assembly 46 into the square slot 70. As insertion continues, the flat, angled portion 80 of the terminal 78 is pushed down by a chamfered lower edge 86 of the conductive cartridge 54. Once the notch 82 is beyond the end of the latch 80, the latch snaps into the notch and locks the cartridge in place.

The assembly thus described reduces the need for adjustment of the brushes and provides equal friction in both directions of motor rotation. The assembly eliminates soldering and provides for a smaller brush block assembly with an increased life expectancy. Finally, the assembly of the improved brush block provides a simplified assembly procedure which substantially reduces the cost of the motor. After assembly, it is but a simple matter to check the motor for its electrical characteristics. As mentioned above, various modifications of the cartridge subassembly and latching terminal subassembly which will become apparent to those skilled in the art after consideration of the foregoing specification.

Accordingly, the embodiments of the invention in which an exclusive property or privilege is claimed are defined as follows:

1. In a miniaturized electric motor having a commutator, the improvement comprising:
    a passageway in said motor between the exterior thereof and said commutator, said passageway being quadrilateral in cross section;
    a cartridge subassembly having a quadrilateral cross section slideably mounted in said passageway;
    a latching terminal subassembly mounted between said passageway and the exterior of said motor;
    said cartridge subassembly including a conductive brush having a quadrilateral cross section, a conductive cartridge formed as a quadrilateral tube for slideably receiving said brush, said cartridge having a surface with a notch therein, and an insulated housing formed as a quadrilateral tube for receiving said cartridge, said housing having a side with a slotted aperture therein;
    said latching terminal subassembly including an insulated bushing, and a terminal mounted within said bushing having a terminal portion on the exterior of said motor and a flattened latch portion offset at an angle to the axis thereof extending into said passageway;
    said flattened latch portion extending through said slotted aperture in said insulated housing and engaging said notch in said conductive cartridge to locate and prevent withdrawal of said cartridge subassembly from said motor passageway with said brush engaging said commutator to establish electrical contact between said brush and said exterior portion of said terminal.

2. A brush block assembly for use in an electric motor, said assembly comprising:
- a conductive brush,
- a cartridge subassembly comprising:
  - a conductive cartridge having an axially aligned aperture to slideably receive said conductive brush therein.
  - a notch means in said cartridge for receiving a latch means,
  - an insulated housing having an opening to receive said conductive cartridge, and
  - a clearance aperture along one side of said insulating housing, said clearance aperture exposing a portion of said conductive cartridge,
- a passageway in said motor for mounting said cartridge subassembly therein, and
- a latching terminal subassembly comprising:
- an insulated bushing mounted in said electric motor between said passageway and the exterior of said motor,
- a terminal having a first portion mounted in said bushing, and
- a second portion comprising a latch means for engaging said notch means and for preventing removal of said cartridge subassembly from said passageway, said second portion being offset at an angle from said first portion and being positioned in said passageway to slideably engage said conductive cartridge through said clearance aperture and to establish an electrical connection therewith.

3. A brush block assembly for use in an electric motor as claimed in claim 2, wherein said cartridge subassembly additionally comprises:
- said conductive brush having a quadrilateral cross section;
- said conductive cartridge having a quadrilateral cross section and a quadrilateral aperture for slideable mounting of said brush;
- said insulated housing having a quadrilateral cross section and a quadrilateral opening for mounting said cartridge; and
- said motor passageway having a quadrilateral cross section for mounting said insulated housing.

4. A brush block assembly for use in an electric motor as claimed in claim 2, wherein:
- said insulated housing clearance aperture is a slot means having a back surface engaging said terminal for limiting and thereby locating said slideable insertion of said cartridge subassembly into said motor passageway.

* * * * *